US00RE34523E

United States Patent [19]

Daudé et al.

[11] E Patent Number: Re. 34,523

[45] Reissued Date of Patent: Jan. 25, 1994

[54] ADHESIVE IN PREPARATION OF LAMINATES

[75] Inventors: Gérard Daudé, Villeneuve d'Ornon; Philippe Girard, Evreux, both of France

[73] Assignee: Saint-Gobain Vitrage, Neuilly-sur-Seine, France

[21] Appl. No.: 478,145

[22] Filed: Feb. 1, 1990

Related U.S. Patent Documents

Reissue of:

[64] Patent No.: 4,623,592
Issued: Nov. 18, 1986
Appl. No.: 213,225
Filed: Dec. 5, 1980

[30] Foreign Application Priority Data

Dec. 6, 1979 [FR] France ..... 79 29968

[51] Int. Cl.[5] ..... B32B 17/10; B32B 27/40

[52] U.S. Cl. ..... 428/423.3; 52/788; 52/789; 156/99; 156/106; 428/425.6; 428/426; 428/423.1

[58] Field of Search ..... 428/349, 423.1, 423.3, 428/425.6, 426; 52/788, 789; 296/84.1; 156/99, 106, 307.5, 313, 315, 324.4, 331.4, 331.7

[56] References Cited

U.S. PATENT DOCUMENTS

| | | | |
|---|---|---|---|
| 3,655,432 | 4/1972 | Hausslein | 428/425.1 |
| 3,889,040 | 6/1975 | Wank | 428/425.1 |
| 3,897,377 | 7/1975 | Broecker | 528/45 |
| 3,916,074 | 10/1975 | Knackstedt | 428/423.5 |
| 3,979,548 | 9/1976 | Schäfer | 428/425.6 |
| 4,039,517 | 8/1977 | Hamamura | 428/423.7 |
| 4,089,844 | 5/1978 | Tsou | 260/30.4 N |
| 4,099,638 | 7/1978 | Tatsumi | 428/425.6 |
| 4,163,094 | 7/1979 | Turpin | 528/45 |
| 4,218,500 | 8/1980 | Rädisch | 428/423.3 |
| 4,232,080 | 11/1980 | Orain | 428/437 |

FOREIGN PATENT DOCUMENTS

| | | |
|---|---|---|
| 916832 | 12/1972 | Canada . |
| 1370480 | 10/1974 | United Kingdom . |
| 1576394 | 10/1980 | United Kingdom . |

*Primary Examiner*—Paul J. Thibodeau
*Assistant Examiner*—D. S. Nakarani
*Attorney, Agent, or Firm*—Oblon, Spivak, McClelland, Maier & Neustadt

[57] ABSTRACT

In the manufacture of a 2-ply sheet of the type which includes on one surface thereof a self-healing polymeric material and on the other surface an adhesive polymeric material capable of adhering at elevated temperatures to a glass or plastic surface, the improvement comprising forming said adhesive polymeric material from a blocked polyurethane or a water soluble or water dispersible polyurethane, and preferably from a polyurethane that has blocked NCO groups and is water soluble or water dispersible.

22 Claims, No Drawings

ADHESIVE IN PREPARATION OF LAMINATES

Matter enclosed in heavy brackets [ ] appears in the original patent but forms no part of this reissue specification; matter printed in italics indicates the additions made by reissue.

This invention relates to the preparation of an article that can be used in the manufacture of a laminate. More particularly, this invention relates to improved means for manufacturing an article which is capable of adhering to the surface of another article.

The invention will be described in connection with the manufacture of a particular type of safety glazing laminate, namely a safety windshield of the type that can be used in an automotive vehicle. However, it should be understood that the invention has wider applicability.

A conventional automotive windshield comprises a transparent plastic sheet sandwiched between two sheets of glass. Recently issued U.S. Pat. No. 4,232,080, assigned to the same assignee as the present invention, discloses an improved safety windshield which has adhered to the surface of the glass sheet which faces the interior of the vehicle a transparent plastic sheet having anti-lacerative and self-healing properties. The plastic sheet functions to protect an occupant of the vehicle from being cut when the inner glass sheet of the windshield is broken or shattered. This can occur as a result of the impact of the head of an occupant against the windshield or as a result of stone or other impact against the outside of the windshield. The plastic sheet resists showing signs of wear and retains its clarity due in part to its self-healing properties. The nature of the polymeric composition comprising the sheet is such that surface deformations such as local indentations tend to disappear or heal within several minutes.

Anti-lacerative, self-healing plastic sheets typically comprise thermoset polymers such as, for example, those described in British Pat. No. 1,370,480. The thermoset polyurethanes disclosed in U.S. Pat. No. 3,979,548, assigned to the same assignee as the present invention, have a combination of properties which make them particularly suitable for use in preparing sheets of the aforementioned type.

Experience has shown that various problems are encountered in adhering a thermoset plastic sheet of the aforementioned type to an underlying glass substrate or to a substrate comprising another material, including, for example, a plastic surface. The present invention relates to improved means for adhering such a sheet to a glass or other surface.

REPORTED DEVELOPMENTS

Numerous methods have been proposed for adhering thermoset plastics of the aforementioned type to glass and other substrates. However, various problems have been encountered with adhering methods heretofore proposed.

The following patents disclose the coating of a glass or plastic substrate by casting thereon a liquid mixture of monomers which react to form the thermoset polymer: Canadian Pat. No. 916,832, British Pat. No. 1,370,480, U.S. Pat. Nos. 3,655,432 and aforementioned 3,979,548. When such a liquid mixture is cast directly onto a curved substrate, for example, a curved glass ply of a windshield, it is virtually impossible to form a film having a uniform thickness. A film which is not uniform in thickness leads to optical defects in the glazing laminate and to other undesirable problems. Experience has shown also that the use of the aforementioned casting technique can result in the formation of a thermoset sheet or coating which exhibits excellent initial adhesion to the glass, but that the adhesive bond weakens when the glass/plastic laminate is subjected to moisture.

U.S. Pat. Nos. 3,889,040 and 3,916,074 disclose the use of poly(vinyl butyral), usually referred to as "PVB", for adhering the aforementioned type of anti-lacerative, self-healing, thermoset polyurethane to a glass or plastic substrate. This is not an entirely satisfactory method because moisture is capable of penetrating a sheet of the thermoset polyurethane, and the moisture affects adversely the binding capability of the PVB.

The use of liquid adhesives has also been proposed to adhere a sheet of anti-lacerative, self-healing thermoset material to various substrates, including transparent glass or plastic substrates. Experience has shown that it is difficult to form from the liquid adhesive a film of uniform thickness, even when the substrate is flat. As mentioned above, differences in the thickness of the adhesive layer, even those which are small and scarcely visible, can cause substantial optical defects in the transparent laminate, such as streaks that create optical distortions which affect adversely the view through the transparency. For windshields, which require particularly good optical qualities, such defects can render them unacceptable.

Many of the problems which are associated with the aforementioned adhering methods have been overcome as a result of the development which is described in [pending U.S. application Ser. No. 70,732, filed Aug. 29, 1979, now abandoned, and assigned to the same assignee as the present invention] *U.S. Pat. No. 4,643,944*. This application discloses the manufacture of a plastic sheet, one surface of which comprises an anti-lacerative, self-healing thermoset material and the other surface of which comprises a thermoplastic material which at room temperature is not adhesive, that is, it is non-tacky, but which is capable of being bonded at elevated temperatures to a substrate such as glass or other material, including plastic transparencies. In forming a laminate which includes the aforementioned sheet, the non-tacky, thermoplastic surface of the sheet is pressed onto a substrate, and the resulting composite is subjected to heat and pressure which cause the thermoplastic surface to adhere to the underlying substrate. Numerous advantages which flow from the use of the aforementioned development are enumerated in aforementioned [U.S. Ser. No. 70,732] *U.S. Pat. No. 4,643,944*, the disclosure of which is incorporated herein by reference.

While the aforementioned development is considered to be an important advance in the art, experience has shown that there are some bothersome aspects associated with the manufacture of the sheet, which as mentioned above, is characterized by having surfaces comprised of two different materials, each with its own peculiar properties. A preferred manufacturing method disclosed in the ['732 application] *'944 patent* comprises casting on a previously formed film of the anti-lacerative, self-healing thermoset polymer a solution comprising the thermoplastic polymer, preferably a thermoplastic polyurethane, dissolved in a suitable solvent. As the solvent is evaporated, aided by heat, there is formed a solid flexible film of the thermoplastic polyurethane bonded to the underlying thermoset film, preferably comprising a thermoset polyurethane. The solvents disclosed in the working examples of the '732 application are organic solvents. It is the use of organic solvents which are an unattractive aspect of the manufacturing process.

The use of an organic solvent typically requires equipment to vent and collect fumes of the evaporated liquid, as well as equipment and procedures to avoid pollution. In order to realize consistent high quality production, the organic-based solution of the thermoplastic polyurethane generally includes other organic materials which are miscible in the solution and which function as evaporation-and viscosity-control agents. The use of such agents is an aid in producing a surface free of orange peel effects, bubbles and pin holes. However, they increase the cost of the manufacturing process.

It is noted also that the nature of the manufacturing process referred to above is such that it is difficult to form a relatively thick film of the thermoplastic material, and for some applications, as will be discussed below, this is a handicap. In addition, there are some applications where it would be desirable to have a higher degree of adhesion between the thermoplastic material and the surface to which it is adhered than can be readily obtained when using the techniques exemplified in the [''732 application] *'944 patent.*

Accordingly it is an object of the present invention to provide improved means for adhering a film of an anti-lacerative, self-healing thermoset plastic to glass, plastic or other surface.

SUMMARY OF THE INVENTION

In one respect, the present invention includes the provision of a polymeric film having optical properties and the surface of which at room temperature is non-tacky, but which at elevated temperature is capable of adhering to a glass, plastic or other surface, including transparent surfaces of glass or plastic, and capable of being formed from a water-based medium. Preferably, the polymeric film is formed from a water dispersible or water soluble polyurethane which is prepared by reacting an NCO-containing polyurethane prepolymer with a compound (hereafter referred to as a "chain extender") which introduces into the polymer chain functional groups which are a source of hydrophilic sites.

In another respect, the present invention includes the provision of a polymeric film having optical properties and a surface which at room temperature is non-tacky, and which is formed from a polymeric composition which includes functional groups which are normally non-reactive, but which are capable of reacting under predetermined conditions with functional groups present in a substrate to which the film is adhered. Preferably, the film comprises a blocked polyurethane prepared by reacting an NCO-containing polyurethane polymer with a compound reactive with the NCO groups of the polymer, but which has the ability to dissociate from the NCO groups at elevated temperature, thereby freeing or unblocking the NCO groups for reacting with active hydrogen-containing groups in the substrate to which the film is being adhered. When the film comprises a ply of a two-ply sheet, the other ply of which comprises an anti-lacerative, self-healing polyurethane having reactive hydroxyl groups, subjecting the sheet to elevated temperatures as it is pressed against a glass sheet results in an unblocking of the NCO groups which can then react with the OH groups of the self-healing polyurethane and also reactive groups, for example, silanol groups, on the glass surface. (Aforementioned U.S. Pat. No. 3,979,548 discloses self-healing polyurethanes having reactive OH groups.) Such reactions can result in chemical linking or bonding of the adhesive film to both the rigid underlying substrate and the self-healing film.

In preferred form, the adhesive film is prepared from a water soluble or water dispersible polyurethane containing NCO groups in blocked form.

With respect to applications involving the manufacture of a two-ply sheet, including a self-healing polymer, the adhesive film can be formed preferably by casting a water based composition comprising the blocked polyurethane in dissolved or dispersed form onto a film of the self-healing polymer and then evaporating the water.

Important advantages that can be realized by practice of the present devemopments can be stated quite simply—use of organic liquids in formation of the film can be avoided and the degree of adherency can be controlled, and even improved through the formation of chemical bonds.

DETAILED DESCRIPTION OF THE INVENTION

The preferred blocked polyurethane for use in the practice of the present invention is one which contains blocked or masked NCO groups. Such polyurethanes are well known and are prepared by reacting a blocking agent with an NCO-containing polyurethane which in turn is prepared from a monomeric mixture which includes an excess of NCO groups relative to the active hydrogen-containing groups which react with the NCO groups to form the polymer chain. The NCO groups of the polyurethane are masked or blocked with compounds which have the ability to dissociate from the NCO groups under selected conditions, as will be described below. This frees the NCO groups for reacting at the desired time with active hydrogen-containing materials to chemically link the polyurethane with the materials.

In preparing the polyurethane, any suitable isocyanate compound can be used, including, for example, aliphatic, cycloaliphatic, aliphatic-aromatic, and aromatic isocyanates, and those which contain ureic functions, and also isocyanate biurets. For glazing laminates, the polyurethane should be prepared from compounds which are capable of forming a polyurethane which resists being degraded by light. As is well known, polyurethanes having good light stability are generally prepared from compounds other than aromatic isocyanates. Examples of isocyanates than can be used are: 1,6-hexane diisocyanate; 2,2,4-trimethyl-1,6-hexane diisocyanate; 2,4,4-trimethyl-1,6-hexane diisocyanate; 1,3-bis(isocyanate methyl)benzene; bis (4-isocyanate cyclohexyl)methane; bis(3-methyl-4-isocyanate cyclohexyl)methane; 2,2-bis(4-isocyanate cyclohexyl)propane; and 3-isocyanate methyl-3,5,5-trimethyl cyclohexyl isocyanate.

Examples of polyols which can be used to form the polyurethane are polyether diols or polyester diols having molecular weights of about 450 to about 2,000 (those of higher molecular weight may cause a reduction in the adhesive properties of the polyurethane); polycaprolactones having a molecular weight of about 500 to about 2,000; polybutadienes having either hydroxyl or carboxyl groups or both of such groups; short-chain diols having a molecular weight of about 50 to about 200; polyacrylic diols; polycarbonate diols; and crosslinking agents such as OH-containing compounds having a functionality greater than or equal to 3 and having a molecular weight of about 60 to about 3,000, and amines of functionality greater than or equal to 3 and having a molecular weight of about 200 to about 1,000. The use of active hydrogen-containing compounds leads to crosslinking in the polyurethane.

Another exemplary class of polyols that can be used are those prepared by the reaction of polyfunctional alcohols and aliphatic diacids or cyclic ethers. Examples of such compounds are: 1,2-ethane diol (ethylene glycol); 1,2-propane diol; 1,3-propane diol; 1,2-butane diol; 1,4-butane diol; 2,2-dimethyl-1,3-propane diol (neopentyl glycol); 1,6-hexane diol; 2-methyl-2,4-pentane diol; 3-methyl-2,4-pentane diol; 2-ethyl-1,3-hexane diol; 2,2,4-trimethyl-1,3-pentane diol; diethylene glycol; triethylene glycol; polyethylene glycols; dipropylene glycol; tripropylene glycol; polypropylene glycols; or 2,2-bis(hydroxy methyl)-1-1-propanol(trimethylol ethane); 2,2-bis(hydroxy methyl)-1-butanol(trimethylol propane); 1,2,4-butane triol; 1,2,6-hexane triol; 2,2-bis(-hydroxy methyl)-1,3-propane diol(pentaerythritol); and 1,2,3,4,5,6-hexane hexol(sorbitol); and cyclohexane dimethanol. Aliphatic diacids that can be used to prepare the aforementioned polyols include, for example, malonic acid, succinic acid, glutaric acid, adipic acid, suberic acid, and sebacic acid.

For use in preparing glazing laminates, it is preferred to use a polyol compound including a polyether polyol or a polyester polyol formed from several diols and at least one polyol with a functionality greater than or equal to 3, or an amine of functionality greater than or equal to 3. Using such polyols, it is feasible to make polyurethanes which exhibit good optical and good adhesive properties after unblocking of the masked isocyanate groups.

The following are examples of blocking agents that can be used to protect or mask the free isocyanate groups of the polyurethane; phenol; ortho-, meta-, or para-cresols and mixtures thereof; xylenol; resorcinol; hydroquinone; catechol; guaiacol; naphthols; alkylphenols, such as, for example, butylphenols, octylphenol, nonylphenol, 2,4-diisobutylphenol and its derivates; 4-hydroxy biphenyl; 6-hydroxytetraline; bisphenols such as isopropylidene-4,4'-bisphenol; lactams such as, for example, lauryl lactam and E-caprolactam; oximes such as, for example, methyl ethyl ketoxime, acetoxime, cyclohexane neoxime, and hydroxylamine; hydrocyanic acid; sodium bisulfite; tertiobutanol; diethyl malonate; ethyl acetoacetate; ethyl cyanoacetate; 2,4-pentanedione; acetyl acetone; diphenylamine; monomethylaniline; aryl mercaptans; alkyl mercaptans; and 1-phenyl-3-methyl-5-pyrazolone.

Reaction conditions known in the art can be utilized to react the blocking agent and NCO-containing polyurethane. Exemplary reactions conditions are included in the examples set forth below.

As mentioned above, another important aspect, of the present invention comprises the formation of an adhesive film from a water dispersible or water soluble polyurethane. This aspect of the invention can be applied to polyurethanes having blocked NCO groups or to those void of NCO groups, but it is preferred that it be used in conjunction with polyurethanes having blocked NCO groups.

In preferred form, the water soluble or water dispersible polyurethane includes either acidic or basic functionality which is capable of forming ionic (hydrophilic) sites within the polymer chain upon treatment with either base or acid respectively. A preferred method for providing the potential ionic sites comprises reacting an NCO-containing polyurethane (prepared from a monomeric mixture which includes a molar excess of NCO groups relative to active hydrogen-containing groups) with a compound (referred to as a "chain extender") that includes active hydrogen, for example, the OH groups of a polyol, and either an acidic or basic group, such as, for example, that present in a carboxylic acid or amine. Examples of chain extenders that can be used are dimethylolpropionic acid, N-methyldiethanolamine; N-phenyldiethanolamine and dialkylaminoethylamine.

A suitable acid or base can be added to the water-based composition to ionize the potential ionic sites incorporated in the polymer chain by the chain extender. For exemplary purposes, it is noted that treatment of a polyurethane containing basic functionality (for example, in the form of an amine) with an aqueous acidic solution will convert the amine into its acid addition salt. On the other hand, treatment of a polyurethane containing acidic functionality (for example, in the form of a carboxylic acid) with an aqueous basic solution will produce a carboxylic acid salt. In either case, this promotes the water solubility or dispersibility of the polyurethane. It is noted also that the inclusion of ionic species such as acid addition salts of amines or carboxylic acid salts may contribute favorably to the adhesion of the polyurethane to an inorganic glass or other surface.

Suitable amounts of chain extender can be used to impart the desired hydrophilic properties to the NCO-containing polyurethane. The required amount of chain extender will depend on the particular NCO-containing polyurethane that is treated and the particular chain extender used. For guidance purposes, it is noted that amounts of chain extender comprising about 4 to about 9 wt. % and preferably about 4.5 to 7.5 wt. % can be used. Aqueous dispersions or solutions comprising about 10 to about 65 wt. %, preferably about 25 to about 50 wt. %, of the polyurethane can be used in forming a film therefrom.

As mentioned above, it is preferred that the adhesive film be prepared from a water soluble or water dispersible blocked polyurethane. A recommended reaction sequence for preparing such a polymer is to subject an NCO-containing polyurethane to a blocking reaction to block some, but not all, of the NCO groups, and thereafter to react the polyurethane having available NCO groups with the reactive hydrogen-containing chain extender. When using a polyol as the chain extender, as is preferred, the numerical ratio of blocked NCO groups to OH groups can be about 1.01 to about 3, although it can be higher. It is preferred that the aforementioned ratio be about 1.01 to about 1.5. It is preferred also that the blocked, water soluble or dispersible polyurethane include some cross-linked chains as a result of the use of a polyol having a functionality of three or more.

While it is possible to form a blocked polyurethane into the desired film or coating utilizing an organic liquid-based system, including, for example, an organic solvent for the blocked polyurethane, the use of the organic liquid is accompanied by the types of problems that have been referred to hereinabove in connection with the use of the organic liquid-based systems described in the aforementioned ['732 application] '944 patent.

The adhesive film can be formed in situ on one of the plies of the laminate. Or the liquid composition from which the adhesive film is formed can be cast all at once or in several stages on a substrate from which it can be removed. After the solid film or sheet is formed, it can be detached from the substrate and used, for example, by sandwiching it between elements from which a laminate is formed.

When the adhesive film is used in the manufacture of a two-ply sheet comprising an anti-lacerative, self-healing ply, it is advantageous to prepare the two-ply sheet in the following manner. A thermoset self-healing polyurethane film is first made by casting on a substrate a liquid mixture of monomers which polymerize to form a solid film. After formation of the film of thickness, for example, of about 0.2 to about 0.8 mm, an aqueous dispersion or solution containing the aforementioned polyurethane is cast thereon and the water is evaporated. (The reverse procedure can be used also, that is, the adhesive film can be first formed and then the self-healing film formed on it.) The two films adhere to one another. The sheet is detached from the casting substrate. It can be easily handled and stored. Another advantage of using a blocking agent is that it renders the adhesive film practically resistant to moisture.

The adhesive film may have a thickness, for example, of about 0.01 to about 1 mm, which will depend on the desired application of use. For those applications where it is desired to have a relatively thick adhesive film, for example, in an application where the film functions as an energy absorber, the film can be formed of several layers of film formed in successive casting operations.

The two-ply sheet can be used to make safety glazings such as, for example, automobile glazings, for example, windshields, glazings for the building industry, safety goggles, etc.

In the manufacture of a glazing laminate, the elements comprising the plies of the laminate are assembled and subjected to heat and pressure, for example, by pressing the elements between the rollers of a calender. At a predetermined elevated temperature, heat unblocks the blocked isocyanate groups which in their unblocked form can then react with active hydrogen groups that may be present in plies which are in contact with the adhesive film to form chemical bonds which chemically link the film with contiguous plies. It should be understood that when the term "unblocked polyurethane" is used herein, it refers to a polyurethane that is derived from a blocked polyurethane.

The temperature at which blocked NCO groups are unblocked can be selected by taking into account various factors, including, for example, desired operating temperatures, the heat resistance of materials being used, and the blocking agent used. Exemplary temperatures are in the range of about 110° to about 150° C.

If desired, the unblocking temperature can be altered by means of unblocking catalysts, as is known. Catalysts that can be used to unblock masked isocyanate groups include, for example, the salts of: mono- or polycarboxylic organic acids; tertiary amines; polyamines which contain at least one tertiary nitrogen; products of the reaction of amines with aldehydes or ketones such as, for example, hexamethylene tetramine or Schiff bases. Other unblocking catalysts which can be used include organometallic compounds or metal complexes in amounts, for example, of about 0.1 to 1% by weight of the total weight of the blocked polyurethane. Exemplary compounds include organostannic derivatives such as, for example, dialkyltin dicarboxylates, dioctyltin dihalides, and metal, for example, zinc, acetylacetonates. Mixtures of tertiary amines and organometallic compounds can be used also.

It should be noted that to the extent that the adhesive film comprises a polyurethane, either blocked or not blocked, that is capable of softening and flowing at elevated temperature, such film can be joined physically to a substrate. Such physical bonds can be supplemented by chemical bonds, as mentioned above.

The composition comprising the adhesive film can further contain various additives such as, for example, anti-UV and antioxidizing agents, adherence promotors or inhibitors, surfactants, spreading agents, and antihydrolysis agents such as, for example, polycarbodiimides, as well as other additives for imparting desired properties to the composition. The additives should be used in amounts that do not have an adverse effect on other properties of the composition. Accordingly, they can be used in small amounts, for example, about 0.1 to about 0.5% by weight of the anti-UV agent with respect to the total weight of the polyurethane, and about 0.1 to about 0.5% by weight of the antioxidizing agent. Isocyanates having a functionality greater than 2 can be included in the composition also. For example, a triisocyanate, such as a biuret of 1,6-hexanediisocyanate can be used to provide partial or more significant cross-linking of the blocked polyurethane.

The adhesive composition of the invention can be used for the manufacture of laminates made of glass, plastic material, for example, polycarbonate, polyamides, acrylics and polyurethanes, and metal, for example, stainless steel, aluminum, etc.

For example, the adhesion composition of the invention can be used for the manufacture of a laminated glazing formed of two sheets of glass between which is sandwiched the adhesive composition which, when of a thickness of about 0.2 mm or more, can play the role of energy absorber.

The adhesive composition of the invention can be used also for the manufacture of a safety glazing formed of a monolithic or laminated substrate, of glass or plastic material, to which an anti-lacerative and self-healing material, as described previously, is bonded by means of the adhesive composition of the present invention.

The adhesive composition of the invention can be used also to assemble a sheet of glass with a sheet of polycarbonate. Such a glazing can be used, for example, as bullet-proof glazing.

EXAMPLES

The first ten examples illustrate the preparation and use of various blocked polyurethanes in accordance with the invention. Unless stated otherwise, "%" means percent by weight.

Example 1

A blocked polyurethane is prepared by vacuum drying for one hour at 120° C. a mixture of polyols comprising (i) 15.7 g (0.0149 mole) of an ester sold by VEBA CHEMIE under the trademark OXYESTER T 1136, (ii) 18.7 g (0.0149 mole) of a polycaprolactone sold by UNION CARBIDE under the trademark NIAZ PCP 230, (iii) 1.2 g (0.0011 mole) of a polyester sold by BAYER under the trademark DESMOPHEN 1100, and (iv) 0.15 (0.0018 mole) of 1,4-butanediol; adding an isocyanate compound comprising 39.4 g (0.147 mole) of IPDI H 3150 sold by HULS; and shanking the reaction mixture for one hour at 60° C. in a nitrogen atmosphere. Subsequently, 0.25% of an antioxidant (IRGANOX 1010) and 0.15% of an anti-UV agent (TINUVIN 770), both sold by CIBA-GEIGY, are added at a temperature of 55° C. Twenty percent of methyl ethyl ketone is added at 60° C. to the formed prepolymer, and this is followed by the addition of the blocking agent, i.e. 15.64 g (0.0977 mole) of diethyl malonate. Thereafter, 7.7 g of a chain extender, N-methyl diethanolamine, are added. The disappearance of the NCO band is observed by spectroscopy. (The resultant numerical ratio of blocked NCO groups to OH groups is about 1.5 to 1.) A colorless paste is obtained.

An aqueous dispersion of the blocked polyurethane is prepared by adding lukewarm deionized water acidified with hydrochloric acid to the previously prepared paste. An aqueous dispersion is obtained, the dry extract of which amounts to 42%.

This dispersion is cast on a previously formed thermoset polyurethane film having self-healing, anti-lacerative properties and of the type described in U.S. Pat. No. 3,979,548. The thermoset polyurethane is prepared utilizing excess —OH, and accordingly, contains reactive hydrogen. The dispersion spreads quite well. The water is evaporated by passing the coated film through a heated tunnel. A two-ply sheet is thus formed, one surface of which comprises an anti-lacerative, self-healing thermoset polyurethane, and the other surface of which comprises a blocked polyurethane that is nonadhesive at room temperature. The ply of blocked polyurethane is about 0.03 mm in thickness.

The two-ply sheet is easy to handle and can be stored, and can be used to make a safety glazing, for example, an automotive windshield. In order to do this, the blocked polyurethane surface of the two-ply sheet is applied to a conventional laminated windshield, that is, one formed of two sheets of glass adhered together by an energy absorbing interlayer, such as poly(vinyl butyral). Heat and pressure are used to produce good adherence between the sheet and the glass surface. The blocked isocyanate functions of the polyurethane are unblocked by heat and the unblocked NCO groups are capable of forming chemical bonds with reactive hydrogen on the glass surface and with reactive hydrogen of the thermoset polyurethane.

A preferred process for assembling the windshield consists of forming a preliminary bond between the sheet and the glass surface by passing the whole between the rollers of a calender or by utilizing an inflatable elastic membrane, as disclosed in U.S. Pat. No. 4,152,188. The definitive or final bond is achieved by autoclaving at a temperature of about 150° C. and a pressure of about 10 bars. During the autoclaving cycle, the blocked isocyanate groups are unblocked.

The resulting windshield is free from optical defects, such as bubbles, and has excellent transparency. The bond between the glass and plastic sheet is good and is maintained even under rigorous conditions. Thus, the sheet remains adhered to the glass surface when the windshield is placed in a warm environment with 95% relative humidity for up to 15 days.

Example 2

A blocked polyurethane is prepared by vacuum drying for one hour at 10° C. a mixture of polyols comprising (i) 28 g (0.0266 mole) of an ester sold by VEBA CHEMIE under the trademark OXYESTER T 1136, (ii) 10.2 g (0.0122 mole) of a polycaprolactone sold by UNION CARBIDE under the trademark NIAX PCP 210, (iii) 15.4 (0.123 mole) of a polycaprolactone sold by UNION CARBIDE under the trademark NIAX PCP 230, (iv) 26.7 g (0.0267 mole) of a polyether sold by QUAKER OATS under the trademark POLYMEG 1000, and (v) 3 (0.0027 mole) of a polyester sold by BAYER under the trademark DESMOPHEN 1100; adding 67 g (0.25 mole) of isophorone diisocyanate (IPDI H 3150 of HULS) at 60° C. in a nitrogen atmosphere with vigorous agitation; and thereafter adding 3% of an anti-UV agent (TINUVIN 770) and 0.5% of an antioxidant (IRGANOX 1010), based on the weight of the polyurethane, and an additional 0.36 g (0.0013 mole) of IPDI H 3150. The reaction is maintained for one hour at 60° C. The blocking agent, i.e. 18.9 g (0.16 mole) of ε-caprolactam, is introduced at this temperature and allowed to react for one hour. Thereafter, 11.4 g (0.085 mole) of dimethylolpropionic acid are added. The disappearance of the NCO band due to free isocyanate groups is followed by IR. (The numerical ratio of blocked NCO groups to OH groups is about 1.5 to 1).

Dissolution of the blocked polyurethane is accomplished by the addition of lukewarm deionized water containing 8.6 g of triethyl amine ($Et_3N$). A clear solution is obtained. The dry extract thereof amounts to 32%.

This aqueous solution is cast, as in the preceding example, on a previously formed self-healing, anti-lacerative polyurethane film, and there is ultimately formed a flexible, two-ply plastic sheet of good optical quality. The sheet is used to form a safety glazing including a glass ply. Assembly of the sheet and glass is done by calendering, followed by an autoclaving cycle, as described in Example 1. Good adherence between the sheet and the glass surface is obtained after the isocyanate functions are unblocked.

Example 3

A blocked polyurethane is prepared by utilizing the procedure described in the preceding examples and reacting together: 74.9 g (0.279 mole) of IPDI H 3150; 17.4 g (0.0165 mole) of OXYESTER T 1136; 51.7 g (0.0413 mole) of NIAX PCP 230; 17.2 g (0.0207 mole) of NIAX PCP 210; and 3 g (0.0027 mole) of DESMOPHEN 1100. Subsequently, 0.3% of an anti-UV agent (TINUVIN 770) and 0.5% of an antioxidant (IRGANOX 1010), dissolved in a minimum of methylethylketone, are added to the prepolymer. Subsequently, 2.2 g (0.0194 mole) of ε-caprolactam are added as a blocking agent and allowed to react with the isocyanate functions for two hours at 60° C. The synthesis is concluded by the addition of 12.3 g (0.103 mole) of N-methyldiethanolamine as chain extender which is allowed to react at 60° C. The progressive disappearance of the isocyanate band is followed by infrared. (The numerical ratio of blocked NCO groups to OH groups is about 1.5 to 1.)

An aqueous dispersion is formed by adding deionized water containing 3.8 g of hydrochloric acid. After vigorous agitation, a fine polyurethane dispersion is obtained. The dry extract of the dispersion amounts to 45%.

This dispersion is used to form a two-ply sheet of the type described in the preceding examples, and a laminated glazing including the sheet is made, as in the preceding examples. The adhesive ply of the sheet exhibits properties comparable to those of the adhesive plies described in the preceding examples.

Example 4

The following are placed in a reactor and dehydrated with a paddle pump for one hour at 100° C.: (A) 51.3 g (0.041 mole) of NIAX PCP 230; (B) 38.2 g (0.0363 mole) of OXYESTER T 136; and (C) 3 g (0.0027 mole) of DESMOPHEN 1100. Thereafter, 67.5 (0.251 mole) of IPDI H 3150 are added at 60° C. and allowed to react for one hour. To the reaction mixture, 0.15% of an anti-UV agent (TINUVIN 770) is added, followed by 0.25% of an antioxidant (IRGANOX 1010) dissolved in 5% methylethylketone. Then, 18.8 g (0.166 mole) of ε-caprolactam are added as blocking agent at 45° C. The reaction is allowed to proceed for 12 hours at ambient temperature, then for one hour at 50° C. Dimethylolpropionic acid is then added at 60° C. for 3 hours. The progressive disappearance of the isocyanate functions is followed by infrared. (The numerical ratio of blocked NCO groups to OH is about 1.5 to 1.)

A solution of blocked polyurethane is formed by adding lukewarm deionized water containing 8.6 g $Et_3N$ as a solubilizing agent. A two-ply sheet is formed by casting the solution on a self-healing and anti-lacerative film comprising a thermoset polyurethane. Water is evaporated. The adhesive layer has a thickness of about 0.03 mm.

The sheet is used to make laminated glazings as described above, the unblocking of the blocked isocyanate groups taking place in the autoclave. The adhesive exhibits properties similar to those of the preceding adhesives.

Example 5

A blocked thermoplastic polyurethane with a numerical ratio of blocked NCO/OH of 1.5 is formed from the following compounds utilizing the procedure described previously:

(A) 67.1 g (0.25 mole) IPDI H 3150;
(B) 80.5 g (0.097 mole) NIAX PCP 210;
(C) 18.8 g (0.16 mole) ε-caprolactam;
(D) 9.4 g (0.07 mole) dimethylol propionic acid; and,
(E) 7.8 g $Et_3N$ An aqueous solution containing 35% of dry extract is obtained. A cross linking agent such as a triol, tetrol or hexol is added in a small excess with respect to the isocyanate groups capable of reacting with the cross-linking agent after the blocked isocyanate groups are unblocked. A two-ply sheet is formed as described previously. The adhesive ply of the sheet exhibits properties similar to those described in the preceding examples.

Example 6

A polyurethane prepolymer is prepared by: (A) forming a polyol mixture of (i) 17.45 g (0.0165 mole) of an ester sold by VEBA CHEMIE under the trademark OXYESTER T 1136, (ii) 20.74 g (0.0165 mole) of a polycaprolactone sold by UNION CARBIDE under the trademark NIXA PCP 230, (iii) 1.35 (0.0012 mole) of a polyester sold by BAYER under the trademark DESMOPHEN 1100, and (iv) 0.16 g (0.0019 mole) of 1,4-butanediol; (B) vacuum drying the mixture for 1 hour at 120° C.; and (C) adding an isocyanate compound comprising 41.93 g (0.156 mole) of IPDI H 3150. The mixture is agitated for 1 hour at 60° C. in a nitrogen atmosphere.

Subsequently, 0.25% of an antioxidant (IRGANOX 1010) and 0.15% of an anti-UV agent (TINUVIN 770) are added at a temperature of 55° C. Twenty percent by weight of methyl ethyl ketone is added at 60° C. to the formed prepolymer, followed by the addition at 60° C. of a blocking agent, i.e. 13.5 g (0.1038 mole) ethyl acetoacetate. The reaction is concluded by the addition of 8 g of a chain extender of the N-methyldiethanolamine type. The disappearance of the NCO band is followed by IR. (The numerical ratio of blocked NCO groups to OH groups is about 1.5 to 1.). A colorless paste is obtained.

An aqueous solution of the blocked polyurethane is prepared by adding lukewarm deionized water acidified with hydrochloric acid to the previously prepared paste. An aqueous dispersion is obtained with a dry extract in the amount of 36% by weight.

A two ply sheet is formed subsequently by casting the aqueous dispersion of blocked polyurethane on a self-healing, anti-lacerative film made of a thermoset polyurethane, in the manner described above. After evaporation of the water, the adhesive ply is measured to have a thickness of 0.03 mm. Used in the manufacture of laminated glazings, the adhesive exhibits properties similar to those of the preceding adhesives.

Example 7

A blocked polyurethane with a numerical ratio of blocked NCO/OH of 1.5 is prepared by mixing 12.9 g (0.0129 mole) of the trademarked product FORMREZ ER 131 sold by WITCO CHEMICAL with 2.1 g (0.00161 mole) of DESMOPHEN 1300 (BAYER) and dehydrating for one hour at 100° C. in the vacuum created by a paddle pump. Subsequently, 14.4 g (0.0647 mole) of the trademarked product IPDI, sold by HULS, are added. The mixture is agitated for 1 hour at 60° C. in nitrogen atmosphere. To the resulting prepolymer, 4.9 g (0.0433 mole) of ε-caprolactam are added. After the reaction, 3.7 g (0.0276 mole) of dimethylolpropionic acid, a chain extender, is added. The disappearance of the NCO band is followed by IR.

Dissolution of the blocked polyurethane is carried out by dissolving it in lukewarm deionized $H_2O$ containing 2.8 g $Et_3N$. A colorless solution of blocked polyurethane is obtained after vigorous agitation.

As in the previous examples, a two-ply sheet is formed which is used in the production of laminated glazings. The product obtained shows the same qualities as the preceding products.

Example 8

A blocked polyurethane with a numerical ratio of blocked NCO/OH equal to 1.5 is prepared in the following manner. A reactor in a nitrogen atmosphere is charged with 532 g (0.532 mole) of a diol sold by WITCO CHEMICAL under the trademark FORMREZ ER 131 and 11.6 g (0.141 mole) of 1,4-butanediol. The mixture is dried for 1 hour at 100° C. under the reduced vacuum produced by a paddle pump after which 556 g (2.504 mole) of the aforementioned trademarked product IPDI is added. The reaction is allowed to proceed for 2 hours at 60° C. Following these steps, blocking of the excess NCO groups is effected using 187.6 of ε-caprolactam, and allowing the reaction to proceed for 1 hour at 70° C. Thereafter, 134.1 g of dimethylolproprionic acid is added at 65° C.

The progressive disappearance of the isocyanate functions is followed by IR.

Dissolution of the blocked polyurethane is accomplished by adding to the polymer 2.26 l of lukewarm deionized water containing 101 g $Et_3N$. A very fine polyurethane dispersion is obtained after vigorous agitation.

As in the preceding examples, a two-ply sheet is formed and then used in the assembly of a laminated glazing. The product obtained after autoclaving has qualities like those of the preceding examples.

Example 9

A blocked polyurethane with a numerical ratio of blocked NCO/OH equal to 1.5 is prepared in the following manner. 13.4 g (0.0127 mole) of OXYESTER T 1136, 12.9 g (0.0129 mole) of POLYMEG 1000, 18.2 g (0.0150 mole) of NIAX PCP 230, and 1.6 g (0.0014 mole) of DESMOPHEN 1100 are mixed in a reactor. The mixture is dried for 2 hours at 100° C. under the vacuum created by a paddle pump. Subsequently, 35.3 g (0.131 mole) of IPDI H 3150 are added drop by drop, and the mixture is then brought to 50° C. in a nitrogen atmosphere.

Two percent by weight of methylethylketone is added to the NCO prepolymer to reduce its viscosity, followed by the addition of 9.9 g (0.087 mole) of ε-caprolactam as blocking agent. The blocking reaction which takes place at 60° C. is accelerated by using 0.1 to 0.5% by weight of a catalyst and temporarily raising the temperature to 100° C. The synthesis of the blocked polyurethane is concluded by the addition of 6 g (0.045 mole) of dimethylolpropionic acid (DMP) at 60° C.

The blocked polyurethane is dissolved in lukewarm deionized water containing 4.52 g of $Et_3N$. As in the preceding examples, a two-ply sheet is formed and is then used in the production of laminated glazings. The resulting product has qualities like those of preceding products.

Example 10

After dehydrating the reactants at 90° C. for 2 hours under a vacuum of 5 mm of mercury, 134 g (0.127 mole) of OXYESTER T 1136 are introduced into a reactor in a nitrogen atmosphere and then 103 g (0.38 mole) of IPDI H 3150 are added dropwise. The mixture is brought to 60° C. The blocking reaction is carried out by the addition of 29 g (0.256 mole) of ε-caprolactam at 70° C. for 3 hours. The synthesis of the polymer is concluded by the addition of 16.5 g (0.123 mole) of dimethylolpropionic acid.

Deionized water containing 12.45 g $Et_3N$ is added and a fine polyurethane dispersion whose dry extract amounts to 28% by weight is obtained. As in the previous examples, a two-ply sheet is formed and then used in the production of laminated glazings. The product has qualities like those of the preceding products.

The next group of examples illustrates the use of the present invention in preparing a polyurethane film having both adhesive and energy absorbing properties.

Examples 11 to 20

Each of the water-based polyurethane compositions of the preceding examples is cast into a transparent film having a thickness of about 0.5 mm. In some of the examples, the film is made by successively casting several layers of composition.

Each of the films is then used to prepare a glazing laminate in which the film functions as an energy absorber and adhesive. One group of laminates is prepared by sandwiching the film between two glass sheets. Another group of laminates is prepared by sandwiching the film between two rigid transparent plastic sheets. In each of the laminates, the film functions to adhere the transparent glass and plastic sheets together. Another group of laminates is prepared by forming the 0.5 mm film on an anti-lacerative, self-healing thermoset polyurethane film. The resulting two-ply flexible sheet is then adhered to a single sheet of glass to form a three-ply windshield, that is, one comprising an outer sheet of glass and an inner sheet of anti-lacerative self-healing polyurethane, each adhered by the energy absorbing film sandwiched therebetween.

Several of the sheets of Examples 1 to 10 above, as identified in the table below, are applied to various substrates, also identified in the table, after which the adherence properties of the sheets are evaluated. The sheets are placed on the substrates and the resulting composite is subjected to pressure and a temperature of about 150° C. which has the effect of unblocking the blocked polyurethane.

In evaluating the adherence properties of the sheet, a strip 5 cm wide is cut in the sheet of each laminate. The end of the strio is plied from the underlying substrate and tensile strength is applied perpendicularly to the surface of the strip at a rate of traction of 5 cm per minute and at a surrounding temperature of 23° C. The mean tensile strength required to disengage the strip is noted. The adherence strength in newtons is reported in the table below.

| | Adherence in Newtons on Substrate Indicated | | | | | |
|---|---|---|---|---|---|---|
| Sheet of: * | Stainless Steel | Aluminum | Polycarbonate | Polyamide | Polymethacrylate | Glass |
| Ex. 2 | >100 | >100 | n.e. | 80 | n.e. | >100 |
| Ex. 4 | >100 | >100 | >100 | 90 | 25 | >100 |
| Ex. 5 | n.e. | >100 | 80 | 80 | 80 | >100 |
| Ex. 9 | >100 | >100 | 50 | n.e. | n.e. | >100 |
| Ex. 10 | >100 | >100 | 50 | 40 | 80 | 70 |

n.e.- not evaluated

The above results show that the present invention can be used to form films which adhere well to a variety of substrates, including, for example, plastics, metals of various types, and glass.

Thus, the present invention can be used in the manufacture of various type laminates. It can be used to particularly good advantage in the manufacture of rigid glass and/or plastic laminates such as laminated glazings of large dimensions, for example, automobile glazings and glazings for the building industry, and laminated glazings of smaller dimensions, for example masks, safety goggles, eyeglasses, etc. It can be used also in the manufacture of laminates containing materials of other types, for example, metals.

We claim:

1. A glazing laminate comprising a self-healing plastic material adhered to a glass or plastic ply by a transparent, humidity-resistant adhesive comprising a thermoplastic polyurethane which is formed by the in situ decomposition of a blocked polyurethane having an excess of blocked isocyanate groups over active hydrogen-containing groups.

2. A glazing laminate according to claim 1 wherein said adhesive is sufficiently thick to function as an energy absorber.

3. A glazing laminate comprising a self-healing plastic material adhered to a glass or plastic ply by a transparent, humidity resistant, thermoplastic polyurethane adhesive, the polymeric chains of which include:

(A) a nonionic polyurethane chain segment formed from a polyisocyanate monomer and a mixture of polyols; and (B) a terminal chain segment of the formula

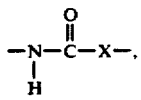

wherein X is NH or O; wherein said terminal chain segment is formed from an isocyanate group terminating said polyurethane chain segment and an active hydrogen-containing group derived from the surface of said ply, said material or said polyurethane chain segment;

wherein the mole ratio of said terminal chain segments to active hydrogen-containing groups in said polyurethane adhesive is greater than 1.01.

4. A glazing laminate according to claim 1 or 3 selected from the group consisting of glazings for transportation vehicles or for the building industry, masks, screens, lenses, and eyeglasses.

5. A pre-formed flexible polymeric sheet having optical properties and capable of being used in preparing a glazing laminate, one surface of said sheet comprising a self-healing thermoset material, and the other surface of said sheet comprising a thermoplastic polyurethane including blocked isocyanate groups, wherein the mole ratio of said blocked isocyanate groups to active hydrogen-containing groups in said polyurethane is greater than one, said wherein said polyurethane is non-tacky at room temperature.

6. A polymeric sheet according to claim 5, wherein said polyurethane is water soluble or water dispersible.

7. A sheet according to claim 6, wherein said polyurethane includes salt groups.

8. A sheet according to claim 7, wherein said salt groups are carboxylic acid salts or acid addition salts of amines.

9. A glazing laminate according to claim 3 wherein said polyurethane adhesive consists essentially of (A), (B), and (C), where:

(C) is a chain extended segment, derived from a chain extruder having a first and a second active hydrogen-containing group, wherein said first active group forms a bond with (A); and said terminal segment is formed from an isocyanate group terminating said polyurethane segment and an active hydrogen containing group derived from the surface of said ply, said material or said second active group of said chain extended segment;

wherein the mole ratio of said terminal segments to said chain extended segments is about 1.01 to about 3.

10. A glazing laminate according to claim 9, wherein said chain extended segment includes an ionic group.

11. A glazing laminate according to claim 10, wherein said ionic group is a basic salt of a carboxylic acid or an acidic salt of an amine.

12. A flexible preformed sheet, having optical properties, comprising a self-healing, plastic ply adhered to a thermoplastic ply which is non-tacky at room temperature and which comprises a polyurethane consisting essentially of:

(A) a nonionic polyurethane segment formed from a polyisocyanate monomer and a mixture of polyols;

(B) a chain extended segment, derived from a chain extender having a first and a second active hydrogen-containing group, wherein said first active group forms a bond with said nonionic polyurethane segment; and (C) a blocked isocyanate segment formed form an isocyanate group terminating said polyurethane segment and a blocking agent;

wherein the mole ratio of said blocked segments to said chain extended segments in said polyurethane is about 1.01 to about 3.

13. A flexible preformed sheet according to claim 12 wherein said chain extended segment includes an ionic group.

14. A flexible preformed sheet according to claim 13 wherein said ionic group is a basic salt of a carboxylic acid or an acidic salt of an amine.

15. An assembly comprising a glass or plastic ply contacted with the adhesive surface of a sheet according to claim 5.

16. A glazing laminate comprising a glass or plastic substrate containing active hydrogen groups bonded to a self-healing thermoset polyurethane material by a transparent humidity resistant thermoplastic polyurethane adhesive wherein isocyanate groups in said thermoplastic polyurethane adhesive have reacted with the active hydrogen groups in said substrate.

17. The glazing laminate of claim [6] *16* wherein said self-healing thermoset polyurethane material contains active hydrogen groups which have reacted with isocyanate groups in said thermoplastic polyurethane adhesive.

*18. The glazing laminate of claim 16, wherein said substrate is comprised of glass, and said thermoset polyurethane is resistant to ultraviolet radiation.*

*19. The laminate of claim 18, wherein said thermoplastic polyurethane is comprised of a polyether urethane.*

*20. The laminate of claim 19, wherein both said thermoset polyurethane and said thermoplastic polyurethane are flexible.*

*21. The laminate of claim 18, wherein said thermoset polyurethane is oxidation resistant.*

*22. A bilayer transparency comprising:*

*a glass ply; and*

*a self-healing multilayer urethane ply including a moisture resistant, thermoplastic polyether urethane layer bonded to said glass ply by a reaction between active hydrogens in said glass ply and isocyanate groups in said polyether polyurethane, and a layer comprising a thermoset, oxidation-resistant polyurethane layer bonded to said polyether urethane layer, wherein both said thermoset and polyether urethane layers are flexible, and which laminate is stable with regard to temperature.*

* * * * *